Dec. 3, 1929.    J. R. DOWNES    1,738,362
METHOD OF AND APPARATUS FOR PURIFYING SEWAGE
Filed Sept. 22, 1928    3 Sheets-Sheet 3
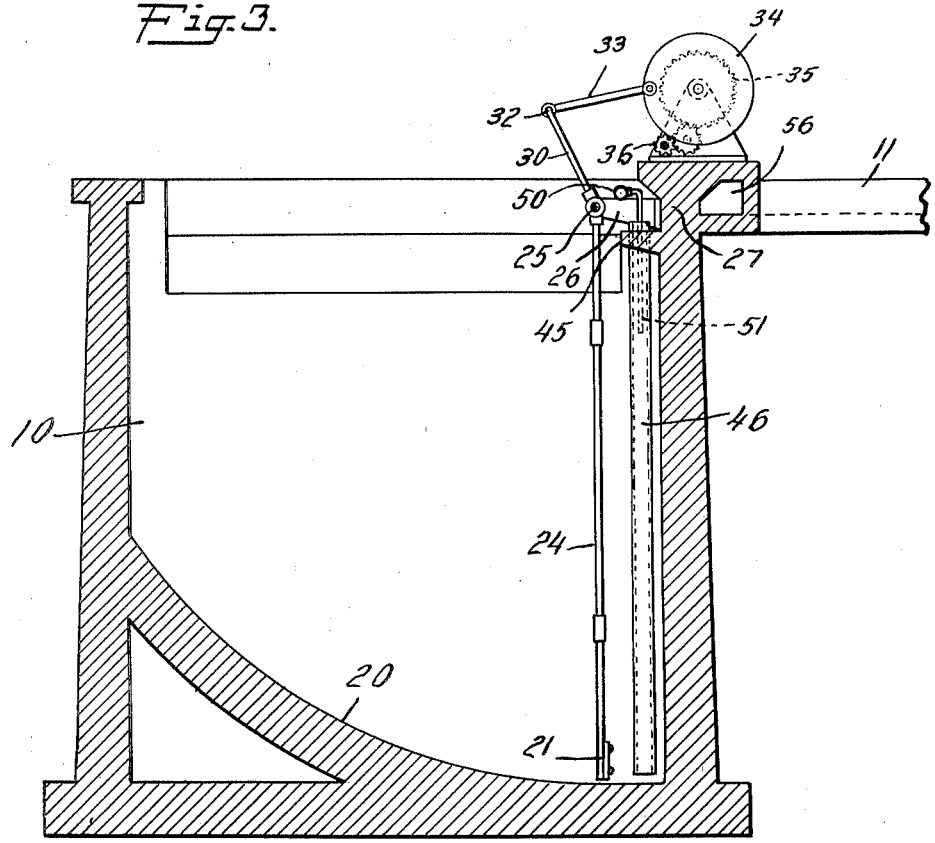
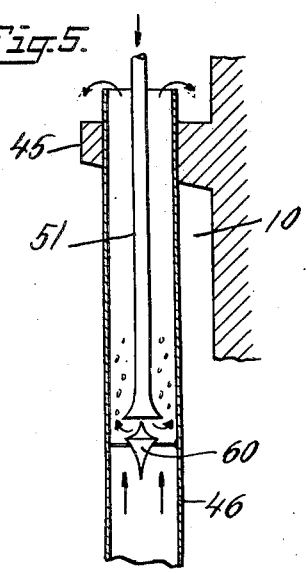
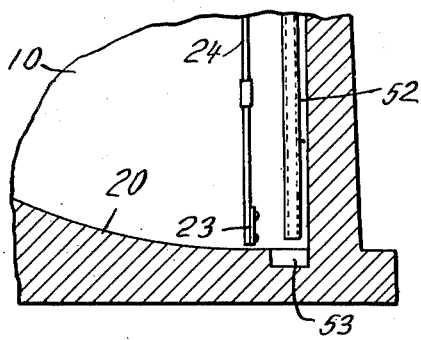
INVENTOR
John R. Downes
BY
Marshall & Hawley,
ATTORNEYS Patented Dec. 3, 1929

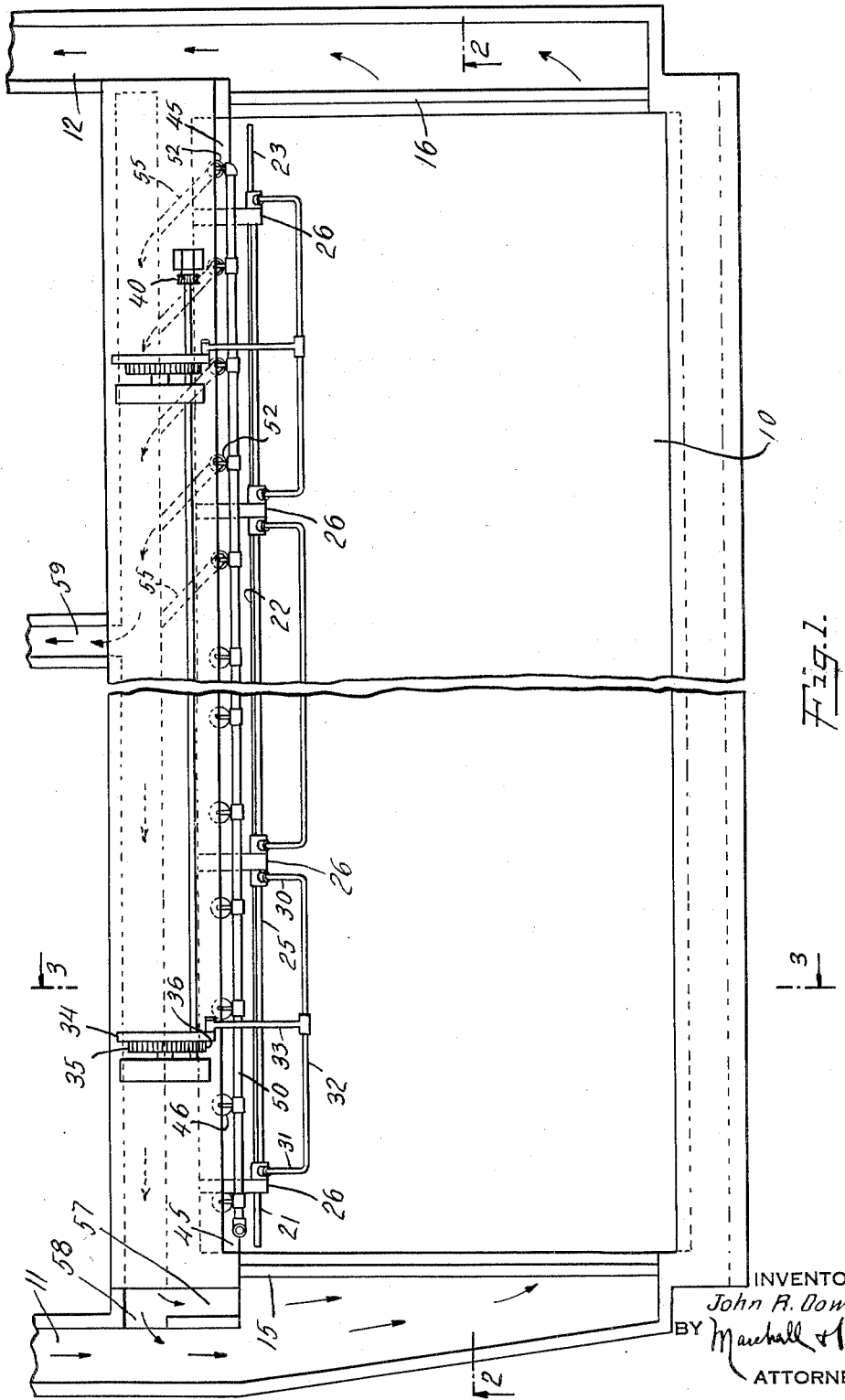

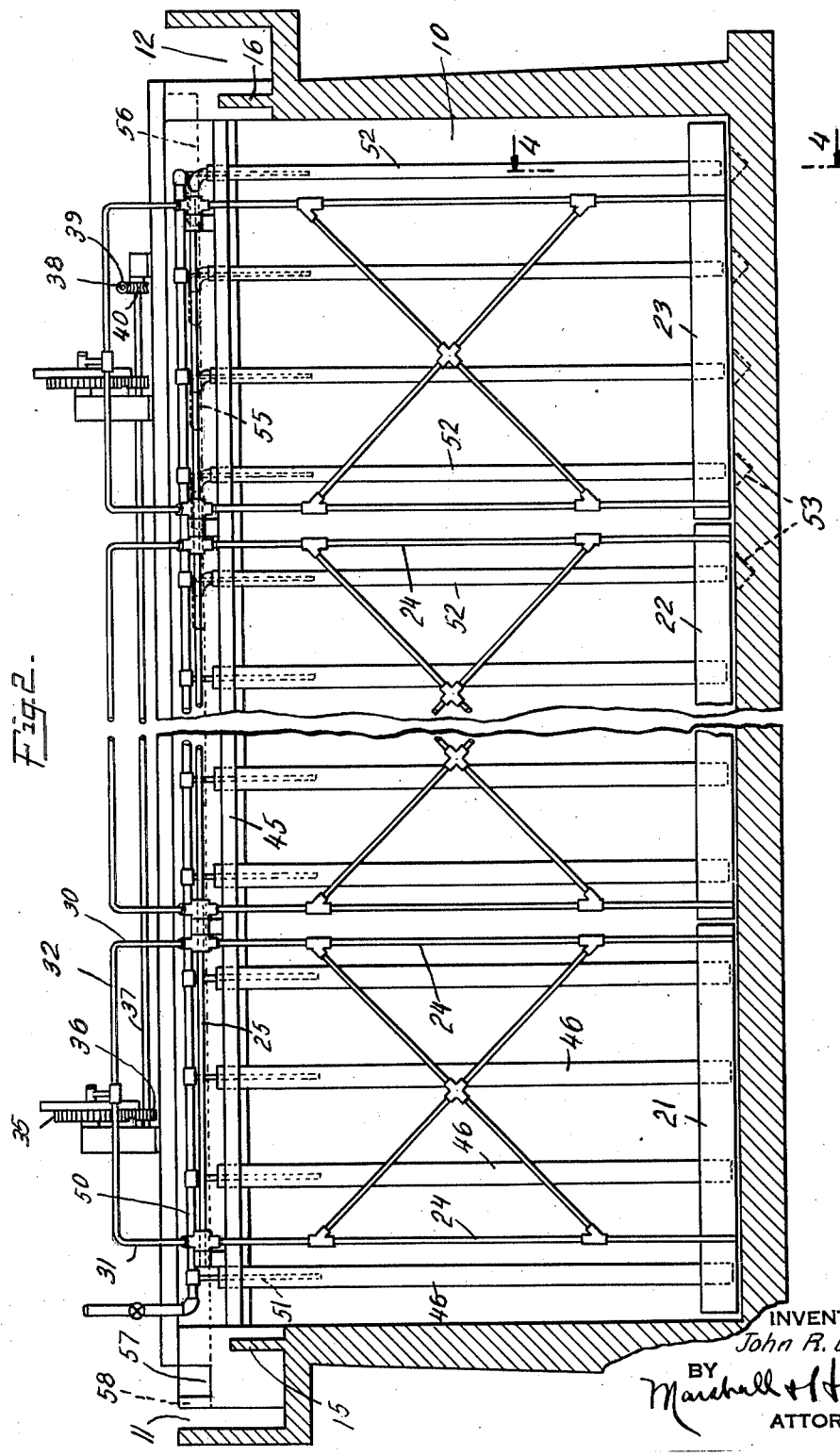

1,738,362

UNITED STATES PATENT OFFICE

JOHN R. DOWNES, OF MIDDLESEX, NEW JERSEY, ASSIGNOR TO PACIFIC FLUSH-TANK COMPANY, OF NEW YORK, N. Y., A CORPORATION OF ILLINOIS

METHOD OF AND APPARATUS FOR PURIFYING SEWAGE

Application filed September 22, 1928. Serial No. 307,573.

This invention relates to methods of and apparatus for purifying sewage.

In the purification of sewage by aeration, it is desirable to prevent the solids from settling and collecting on the bottom of the tank. Also, the air used for oxidizing and purifying the sewage should engage and contact with the entire mass thereof.

It has been proposed to aerate or activate sewage by forcing air through porous plates at the bottom of the tank in which the sewage is contained. This method requires high pressure, due to the weight of the sewage mass and to the resistance offered by the porous plates. Furthermore, the plates become clogged by the solids that settle on the bottom of the tank and, therefore, require frequent cleaning. Moreover, the system just referred to necessitates the use of air cleaners and purifiers to remove dust, oil and other impurities from the air utilized, since such substances tend to clog the openings through the porous plates.

This invention has for its salient object to provide a simple, practical and efficient method of and apparatus for aerating or activating sewage.

Another object of the invention is to provide a method of and apparatus for purifying sewage, so constructed and carried out and arranged that a minimum amount of apparatus and power will be required.

Another object of the invention is to provide a method and apparatus of the character specified, so carried out and constructed and arranged that the sewage can be aerated by the use of air at a relatively low pressure and the air will contact with the entire mass of sewage during the treatment or purification thereof.

Another object of the invention is to provide a method and apparatus of the character described, so carried out and utilized that air cleaners and purifiers will not be required.

Another object of the invention is to provide a method of and apparatus for maintaining the sewage in continuous motion during the aeration thereof.

Another object of the invention is to provide a method of and apparatus for aerating sewage, so arranged that the introduction of air under pressure above the bottom of the tank will cause the sewage and sludge to be lifted thereby.

Another object of the invention is to provide a method of and apparatus for aerating sewage, so arranged that the introduction of air under pressure into the sewage will aerate and activate the sewage and will also cause an upward movement thereof.

Further objects of the invention will appear from the following specification taken in connection with the drawings, which form a part of this application, and in which Fig. 1 is a top plan view of one form of apparatus adapted for use in carrying out the method and constructed in accordance with the invention;

Fig. 2 is a sectional elevation taken substantially on line 2—2 of Fig. 1;

Fig. 3 is a transverse sectional elevation taken substantially on line 3—3 of Fig. 1;

Fig. 4 is a detail sectional elevation, partly broken away, taken substantially on line 4—4 of Fig. 2; and Fig. 5 is a detail sectional elevation showing a slightly modified form of discharge nozzle for one of the air inlet pipes.

The invention briefly described consists of a method of purifying sewage by aeration, which consists of forcing air into the sewage and causing the sewage to be kept in motion during the aeration thereof. In carrying out the method, the sludge which settles by gravity on the bottom of the tank is prevented from accumulating by mechanical means, such as scrapers, which are moved back and forth or oscillated across the bottom of the tank. Furthermore, the aeration is accomplished by introducing air into the sewage above the bottom of the tank instead of through perforated plates in the bottom of the tank. For instance, the air may be introduced three feet below the level of the sewage, and the apparatus is so arranged that the introduction of air in this manner will cause the sludge and sewage to be lifted through conduits, thus effecting an upward motion of the sewage at the side of the tank where the aerating pipes are located. This motion of the sewage, in combination with the longitudinal motion of the sewage in the tank, due to the introduction thereof at one end of the tank and discharge of a portion thereof at the other end of the tank, causes the sewage and sludge to travel through the tank from one end to the other in a spiral path.

Further details of the invention will appear from the following description.

In the form of apparatus illustrated, there is shown an elongated tank 10, which may be formed of concrete or other suitable material. An inlet trough 11 is provided for introducing the sewage into one end of the tank and a discharge trough 12 is formed at the top of the other end of the tank for conducting the aerated sewage or sludge from the tank. A partition 15 is provided between the discharge end of the inlet trough 11 and the main portion of the tank, the upper edge of the partition being disposed below the level of the sewage in the tank.

A partition 16 is also provided between the inlet end of the discharge trough 12 and the main portion of the tank, this partition also having its upper edge disposed below the level of the sewage in the tank.

The bottom 20 of the tank is curved or arcuate, as shown in Fig. 3, the rear portion of the tank, viewing Fig. 1, being deeper than the front portion.

In order to prevent the solids from plugging or accumulating on the bottom of the tank, mechanical means is provided for scraping the sludge or solids from the bottom. This means consists of a plurality of plates or scrapers 21, 22 and 23, carried by arms 24 mounted on a shaft 25 which in turn is carried by brackets 26 supported on the rear wall 27 of the tank. Each of the scrapers or plates is mounted on the lower end of two arms 24, and each set of arms has connected thereto legs 30 and 31 of a yoke 32. Each yoke 32 is oscillated by a link or pitman 33 which is connected at one end to the yoke and at its opposite end to a disk 34. Each disk has secured thereto a gear 35 which meshes with a gear 36 carried by a shaft 37, the shaft 37 being driven from a shaft 38 by a worm and worm gear connection 39 and 40. The shaft 38 may be driven in any suitable manner.

From the foregoing description it will be clear that as the drive shaft 38 is rotated, the shaft 37 will be driven and through the gear connections and disk will cause the arms 24 and legs or scrapers carried thereby to be oscillated back and forth across the bottom of the tank. This movement of the scrapers will prevent the bulking or accumulation of the sludge or solids on the bottom of the tank and will cause this matter to be moved toward the bottoms of the lift pipes hereinafter described.

The rear wall of the tank has formed on or secured thereto and projecting forwardly thereon, a shelf or ledge 45 having its upper surface disposed substantially at or slightly above the flow line or level of the sewage. The ledge 45 has secured thereto and projecting downwardly therethrough, a plurality of lift pipes 46 which are open at both ends. An air pressure conduit 50 is supported on the brackets 26 and has branch discharge conduits 51 connected thereto, one discharge conduit extending downwardly into each of the lift pipes 46.

The lift pipes at the right hand end of the tank, viewing Figs. 1 and 2, are preferably made smaller in cross section and are designated by reference character 52. These pipes are open at their lower ends and the bottom of the tank is provided with a plurality of recesses or notches 53 disposed beneath the lower open ends of the pipes 52.

The upper ends of the pipes 52 communicate with angularly disposed conduits 55 which discharge at their other ends into a conduit 56 formed on the rear end portion of the end wall 27. The conduit 56 extends longitudinally of the tank throughout the length of the tank, one end communicating through passages 57 and 58 with the intake trough 11. The conduit 56 also communicates intermediate its ends with a discharge conduit 59 through which the material is conducted away from the tank to sewage digestion tanks or other desired apparatus.

In the apparatus above described, the method operates as follows: From the showing, particularly in Fig. 1, it will be seen that the sewage flows into the tank at one end. The solids tend to settle in the tank to the bottom thereof and as they settle they collide with other portions of the material which adhere thereto. The sludge or solid matter, however, is prevented from accumulating or bulking on the bottom of the tank by the oscillating plates or scrapers which scrape the material downwardly to a position adjacent the lower ends of the air lift pipes 46. Air is forced under pressure through the conduits 51 and engages the sludge, solids and the liquid matter, thus making this matter more buoyant than the remaining mass of sewage. Since the portion of the material aerated by the air is more buoyant, the weight of the remaining mass of sewage will force this material in which the air is entrained upwardly in the air lift pipes 46 and the aerated material will be discharged from the pipes 46 onto the shelf or ledge 45 which, as above stated, is located at or near the flow line of the sewage. The sewage becomes further aerated as it is discharged on or splashes on the shelf or ledge 45. The material so discharged is caused to flow across the surface of the tank contents and turns downwardly again toward the bottom of the tank and back to the intake ends of the air lift pipes.

The material discharged by the air lift pipes on the ledge 45 consists of a combination of liquid, solids in suspension, and air. The solids are carried with the liquid across the surface of the tank conduits and as they settle tend to accumulate larger aggregates of material. These aggregates, due to the aeration described, will entrain and absorb enough air from the air lift to keep them from becoming septic for a short time, and the scrapers, as stated, forward them again to the intake ends of the air lift pipes before the entrained air is exhausted. The aerating process is then repeated.

It will be obvious that a portion of the air used to aerate the material and to lift the liquid and solids in suspension in the air lift pipes will escape into the atmosphere, but the portion absorbed by or entrained by the liquid and solids will continue its purification work since the oxygen in the air serves to stabilize the organic matter of the sewage and particularly in conjunction with the flocculent solids, oxidation will take place so rapidly that no disagreeable odor will escape into the atmosphere from the sewage.

The portion of the tank in which the lift pipes 52 are located is used for sedimentation and, therefore, undue agitation is avoided therein. The lift pipes 52 do not deliver the material to the ledge but the sludge which settles in this portion of the tank is partially returned through the conduit 56 to the intake end of the tank and is also partially discharged from the apparatus through the conduit 59. Any excess of sludge or solid matter over that required to maintain the process in operation is removed as required through the conduit 59 or other conduits leading to sewage digestion tanks or other desired apparatus.

If desired, the lower ends of the air discharge conduits 51 may be flared as shown in Fig. 5, and a plug 60 may be supported in the air lift pipe 46 or 52 beneath the discharge end of the conduit 51. The plug, as shown in Fig. 5, tends to deflect the air laterally and facilitate the upward movement of the material in the lift pipe. The shape of the lower portion of the plug deflects the sludge laterally away from the lower end of the conduit 51 and toward the upward current.

From the foregoing description it will be seen that the method and apparatus outlined will cause the sewage to move in a spiral path from one end of the tank to the other. In this way the solid matter will be repeatedly aerated or acted upon by the air. Furthermore, the oscillating movement of the scrapers will prevent any undue accumulation or bulking of the solids on the bottom of the tank.

Since the air which is used for aerating and lifting the material is introduced into the tank in the upper portion of the sewage, it will be obvious that very much less pressure of air is required than is required in an apparatus in which the air is introduced through porous plates in the bottom of the tank.

It should be clear from the above explanation that the method and apparatus described is simple, practical and efficient, and is capable of continuous use without requiring any cleaning of the parts or any air cleaner or strainer.

Although certain forms of apparatus have been particularly shown and described, it will be clear that the method can be carried out by other apparatus and that changes in the construction and in the arrangement of the various parts of the apparatus may be made without departing from the spirit or scope of the invention, as expressed in the following claims.

What I claim is:

1. Apparatus for purifying sewage comprising a tank, air inlet pipes arranged adjacent one wall of the tank, and means for scraping material across the bottom of the tank toward said wall.

2. Apparatus for purifying sewage comprising a tank, air lift pipes in the tank, and means for discharging air into said pipes in the upper portions thereof.

3. Apparatus for purifying sewage comprising a tank, a ledge in said tank having an upper surface located near the level of the sewage in the tank, lift pipes mounted on and extending downward through the ledge, and means for causing the sewage to flow upwardly through the pipes.

4. Apparatus for purifying sewage comprising a tank, a ledge in said tank having an upper surface located near the level of the sewage in the tank, lift pipes mounted on and extending downward through the ledge, and means for causing the sewage to flow upwardly through the pipes, the upper ends of the pipes being open and disposed adjacent the upper surface of the ledge.

5. Apparatus for purifying sewage comprising a tank, means for conducting sewage into the tank at one end, a discharge conduit adjacent the other end of the tank, and means adjacent one wall of the tank for raising and aerating sewage in the tank.

6. Apparatus for purifying sewage comprising a tank, air inlet pipes arranged adjacent one wall of the tank, and oscillating means for scraping material across the bottom of the tank toward said wall.

JOHN R. DOWNES.